(12) United States Patent
Eravelli et al.

(10) Patent No.: US 8,644,260 B2
(45) Date of Patent: Feb. 4, 2014

(54) APPARATUS AND METHOD FOR INCREASING RELIABILITY OF SERVING CELL CHANGE

(75) Inventors: Srinivasa R. Eravelli, San Diego, CA (US); Yun Lin, San Diego, CA (US); Hailiang Cai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 794 days.

(21) Appl. No.: 12/707,000

(22) Filed: Feb. 17, 2010

(65) Prior Publication Data

US 2011/0044292 A1    Feb. 24, 2011

Related U.S. Application Data

(60) Provisional application No. 61/174,705, filed on May 1, 2009.

(51) Int. Cl.
  *H04W 4/00* (2009.01)
(52) U.S. Cl.
  USPC .......................................................... 370/332
(58) Field of Classification Search
  USPC .......................................................... 370/332
  See application file for complete search history.

(56) References Cited

U.S. PATENT DOCUMENTS

| 6,819,927 B1 | 11/2004 | Sato |
| 2005/0143061 A1 | 6/2005 | Hossain et al. |
| 2007/0097918 A1* | 5/2007 | Cai et al. ........................ 370/331 |
| 2008/0261599 A1 | 10/2008 | Mohanty et al. |
| 2011/0026489 A1* | 2/2011 | Hossain et al. ............... 370/331 |

FOREIGN PATENT DOCUMENTS

| EP | 0837617 A2 | 4/1998 |
| JP | 2006054625 A | 2/2006 |
| JP | 2007019982 A | 1/2007 |
| TW | I237960 B | 8/2005 |
| TW | I300657 B | 9/2008 |
| WO | 9962285 A1 | 12/1999 |

OTHER PUBLICATIONS

ETSI MCC: 3GPP Draft; R2-087432_REPORT_RAN2_63BIS_PRAGUE, 3rd Generation Partnership Project (3GPP), Mobile Competence Centre; 650, Route Des Lucioles; F-06921 Sophia-Antipolis Cedex; France, no. Prague, Czech Republic; 20081119, Nov. 19, 2008, XP050321913.
International Search Report and Written Opinion—PCT/US2010/033323, International Search Authority—European Patent Office—Aug. 6, 2006.
Nokia Siemens Networks et al: "Target cell HS-SCCH monitoring window" 3GPP Draft; R2-086223, 3rd Generation Partnership Project (SGPP), Mobile Competence Centre; 650, Route Des Lucioles; F-06921 Sophia-Antipolis Cedex; France, no. Prague, Czech Republic; 20081103, Nov. 3, 2008, XP050321235.
Taiwan Search Report—TW099113947—TIPO—Jul. 6, 2013.

(Continued)

*Primary Examiner* — Sulaiman Nooristany
(74) *Attorney, Agent, or Firm* — Darren M. Simon

(57) ABSTRACT

Methods and apparatus are described herein to manage a serving cell change. A HS-SCCH monitored set is maintained to store entries for all pending serving cell change requests. The HS-SCCH for each entry is monitored for a timer period. Once a change request has been confirmed for one entry, monitoring for the other entries continues until expiration of the associated timers.

20 Claims, 11 Drawing Sheets

(56) References Cited

OTHER PUBLICATIONS

Ericsson: "Introduction of HS-DSCH cell chanae enhancements," 3GPP TSG RAN WG2 #83, R2-084583, Jeju Island, Korea, May 18-22, 2008, pp. 1-4.

Huawei: "Interaction between HS-DSCH serving cell change and CPC," 3GPP TSG RAN WG1 Meeting #54bis, R1-083578, Sep. 29-Oct. 3, 2008, pp. 1-2.

Qualcomm Europe: "HS-SCCH Order used in Enhanced Serving Cell Change," 3GPP TSG-RAN WG2 4#63, R2-084296, Aug. 18-Aug. 22, 2008, p. 1.

Qualcomm Europe, Huawei: "UE Reconfiguration Timing in Enhanced Serving Cell Change," 3GPP TSG-RAN WG1 #54, R1-082818, Aug. 18-Aug. 22, 2006, p. 1.

Qualcomm Europe: "Timeline of Enhanced Serving Cell Change Procedute", 3GPP TSG-RAN WG2 #62-bis, R1-082695, Jun. 30-Jul. 4, 2008 pp. 1-2.

\* cited by examiner

APPARATUS AND METHOD FOR INCREASING RELIABILITY OF SERVING CELL CHANGE

CLAIM OF PRIORITY UNDER 35 U.S.C. §119

The present Application for Patent claims priority to Provisional Application No. 61/274,705 entitled "Method to Increase Reliability of an HSDPA Enhanced Serving Cell Change (ESCC) Procedure" filed May 1, 2009, the entirety of which is hereby expressly incorporated by reference herein.

BACKGROUND

1. Field

This application relates generally to wireless communications, and more particularly to handling handovers during a wireless communication session.

2. Background

Enhanced Serving Cell Change (ESCC) is a feature in 3GPP Release 8 designed to improve reliability of the serving cell change procedure. In an ESCC procedure, the network receives a serving cell change request, such and an event 1d (e1d) measurement report message (MRM), and decides to perform a serving cell change. Rather than sending a Physical Channel Reconfiguration message on the source cell HSPDA link, the network sends HS-SCCH orders on the target cell to instruct the UE to start a serving cell change procedure.

Once a user equipment (UE) sends a change request message, the UE begins to monitor the HS-SCCH from the target cell. Once the network processes the change request, the network orders the target cell to send HS-SCCH orders. When a sufficient number of HS-SCCH orders are received by the UE, the UE sends an acknowledgement to the network and starts to receive data from the target cell.

In a rapidly changing RF environment, it is common to generate multiple measurement events back-to-back. In the ESCC procedure, as soon as an e1d MRM is sent, the UE starts to monitor the HS-SCCH for the target cell. That is, the UE assumes that the network will process the e1d MRM just sent by the UE next. However, the network is not required to process e1d MRM messages in the same order as is assumed by the UE. Accordingly, as only a single target cell is monitored at a time even where multiple e1d MRMs are pending, unnecessary serving cell change failure can occur if the e1d MRMs are not processing in the same order by the UE and the network. It would be desirable to have a system and method to alleviate these and other problems associated with the ESCC procedure.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with some aspects of the disclosure, a method of changing a high speed data serving cell comprises making a first determination, at a mobile user equipment, to switch a high speed data link from a source serving cell to a first target serving cell; transmitting a first serving cell change request message indicating the first determination to switch to the first target serving cell; monitoring for a first serving cell change order from the first target serving cell for a first time period associated with a first timer; making a second determination, while monitoring for the first serving cell change order from the first target cell, to switch the high speed data link to a second target serving cell; transmitting a second serving cell change request message indicating the second determination to switch to the second target serving cell; and monitoring for a second serving cell change order from the second target serving cell for a second time period associated with a second timer, the second time period occurring during at least a portion of the first timer period.

In accordance with some aspects of the disclosure, an apparatus comprises means for making a first determination to switch a high speed data link from a source serving cell to a first target serving cell; means for transmitting a first serving cell change request message indicating the first determination to switch to the first target serving cell; means for monitoring for a first serving cell change order from the first target serving cell for a first time period associated with a first timer; means for making a second determination, while monitoring for the first serving cell change order from the first target cell, to switch the high speed data link to a second target serving cell; means for transmitting a second serving cell change request message indicating the second determination to switch to the second target serving cell; and means for monitoring for a second serving cell change order from the second target serving cell for a second time period associated with a second timer, the second time period occurring during at least a portion of the first timer period.

In accordance with some aspects of the disclosure, an apparatus comprises a serving cell processing module configured to make a first determination to switch a high speed data link from a source serving cell to a first target serving cell; and transmit a first serving cell change order request message indicating the first determination to switch to the first target serving cell; and a HS-SCCH monitoring module configured to monitor for a first serving cell change order from the first target serving cell for a first time period associated with a first timer, wherein the serving cell processing module is further configured to make a second determination, while monitoring for the first time period, to switch the high speed data link to a second target serving cell, and to transmit a second serving cell change request message indicating the second determination to switch to the second target serving cell, and wherein the HS-SCCH monitoring module is further configured to monitor for a second serving cell change order from the second target serving cell for a second time period associated with a second timer, the second time period occurring during at least a portion of the first time period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Several aspects of communications systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
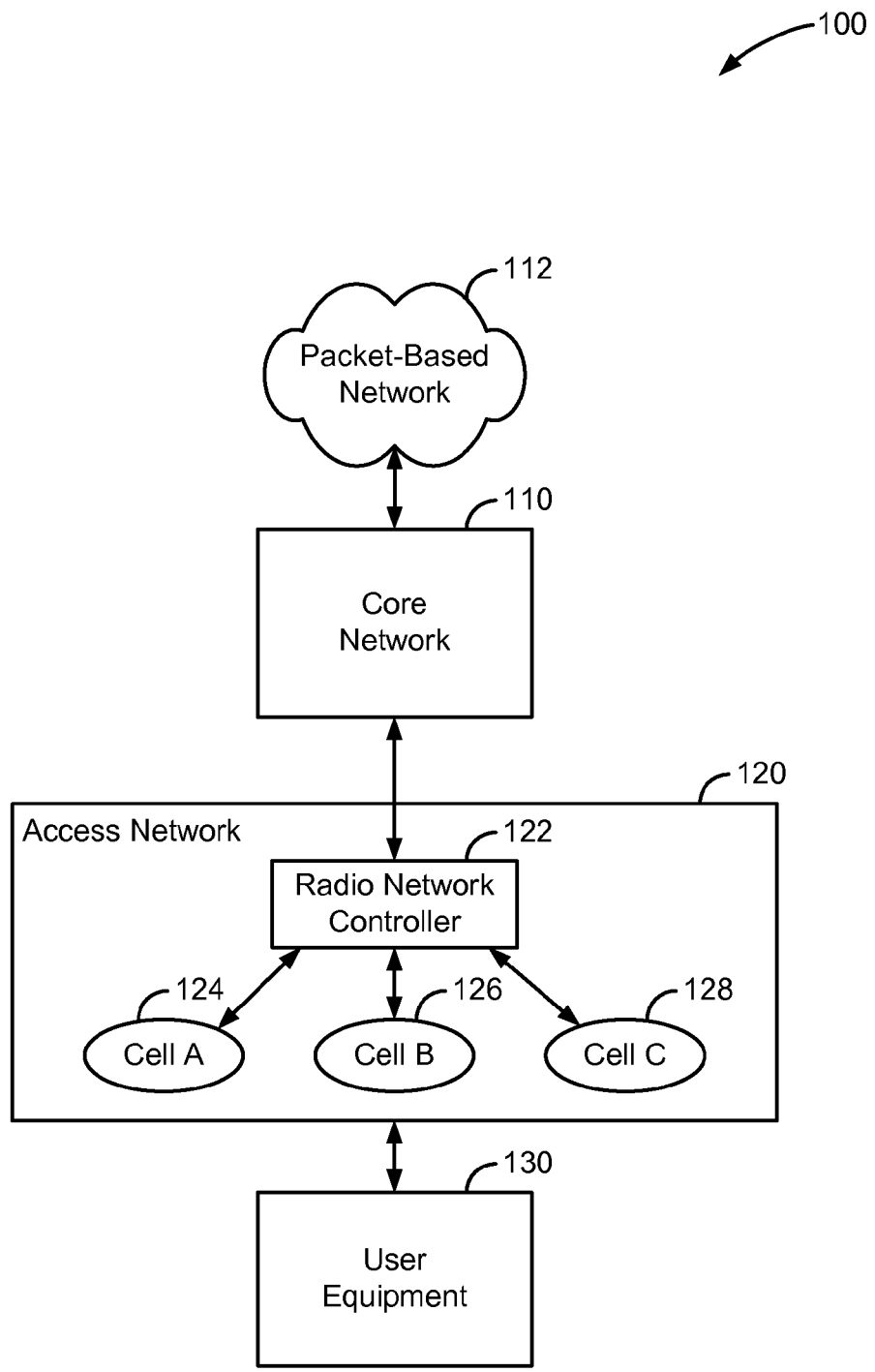
FIG. 1 depicts an exemplary network architecture, in accordance with various described aspects.

An example of a communications system employing various apparatus will now be presented with reference to a network architecture 100 as shown in FIG. 1. As those skilled in the art will readily appreciate from the detailed description to follow, the various concepts presented herein are well suited for High-Speed Downlink Packet Access (HSDPA) applications. However, these concepts may be readily extended to other communications standards. By way of example, these concepts may be extended to Long Term Evolution (LTE), Evolution-Data Optimized (EV-DO), Ultra Mobile Broadband (UMB), and/or other communications standards.

The network architecture 100 is shown with a core network 110 and an access network 120. The core network 110 may provide packet-switched services to the access network 120. For example, core network 110 may provide a connection for access network 120 to a packet-based network 112, such as the Internet. However, as those of skill in the art will readily appreciate, the various concepts presented throughout this disclosure may be extended to core networks providing access to other types of packet-based networks as well as to circuit-switched network services.

Access network 120 may serve as an access point to the core network 110 for a mobile apparatus 130. Examples of a mobile apparatus include a cellular phone, a smart phone, a session initial protocol (SIP) phone, a laptop, a personal digital assistant (PDA), a satellite radio, a global positioning system, a multimedia device, a video device, a digital audio player (e.g., MP3 player, a cameral, a game console, or any other similar functioning device. The mobile apparatus 130 is commonly referred to as a user equipment (UE) in applications such as HSDPA and LTE, but may also be referred to by those skilled in the art as a mobile station, a subscriber station, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Access network 120 may include a Radio Network Controller (RNC) 122 linked to a plurality of cells. Three cells, designated by reference numerals 124, 126, and 128 are shown in FIG. 1. Each of cells 124, 126, and 128 may be covered by one or separate Node Bs (not shown). The Node Bs may be terrestrial base stations capable of communicating with UE 130 wirelessly. Cells 124, 126, and 128 may be called sectors of a serving Node B, for example, where the cells are served by a single Node B.

UE 130 may establish initial communications via one of the plurality cells, which is know as the serving cell. For example, if UE 130 has established a communication session through cell 124, then cell 124 would be known as the serving cell. UE 130 may maintain an active set (ASET) of cells. The active set includes pilot signal strength and/or other information related to cells in addition to the serving cell. The other cells in the active set may become the candidates for the serving cell if the signal pilot strength exceeds that of the serving cell. For example, as UE 130 moves to a different coverage area, such as the coverage area provided by cells 126 or 126, the pilot signal strength from one or these cells may exceed that of the current serving cell—cell 124. In a communication system such as HSPDA, the serving cell is tracked by both the network and the mobile. That is, both UE 130 and access network 120 track the serving cell. Typically, event 1d ("e1d") reporting is used to provide e1d measurement reports (MRMs) which are sent by UE 130 to access network 120 indicating a desired serving cell change.

Figure 2:
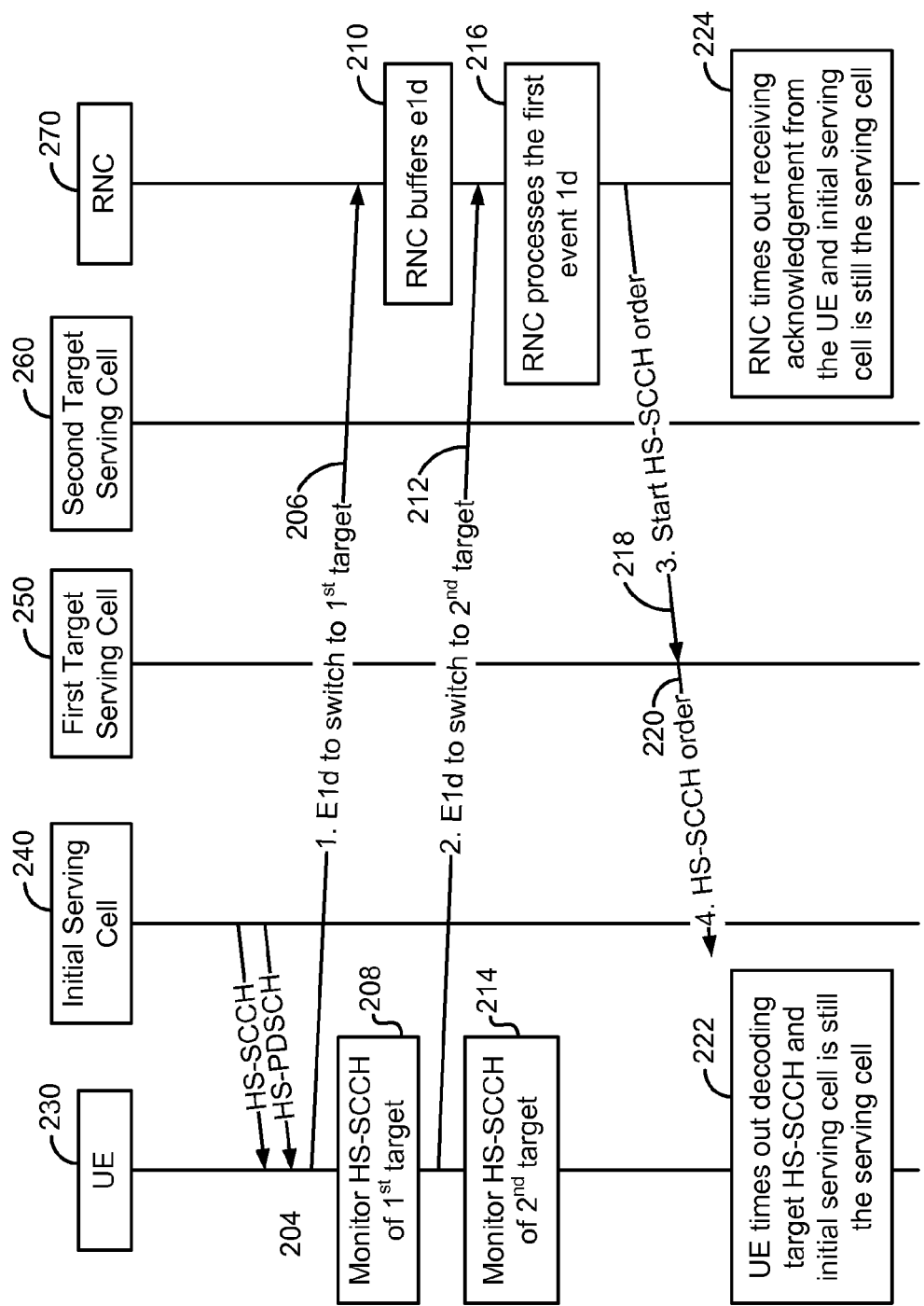
FIG. 2 is a message diagram depicting a conventional serving cell change process.

FIG. 2 is a message flow diagram depicting a serving cell change process that may occur in a conventional HSPDA network implementing the enhanced serving cell change (ESCC) mechanism defined in 3GPP Release 8. A UE 230 may be communicatively coupled to an initial serving cell 240, a first target serving cell 250, and a second target serving cell 260. Information related to these cells may be maintained in the active set (ASET) of UE 230.

Since cell 240 is initially the serving cell, it transmits signaling and data to UE 230 via the HS-SCCH and HS-PDSCH, respectively, as depicted at 204. As depicted at 206, UE 230 may transmit an e1d MRM to RNC 270 upon determining that first target serving cell 250 has become stronger than initial serving cell 240. This message indicates that UE 230 wishes to perform a serving cell change from initial serving cell 240 to first target serving cell 250. Upon sending the first e1d MRM, UE 230 may begin to monitor the HS-SCCH of the first target 250, as depicted at 208. RNC 270 buffers the first e1d MRM for processing, as depicted at 210.

As shown at 212, UE 230 may send a second e1d MRM to RNC 270, the second e1d MRM requesting a change to the second target serving cell 260. The second e1d MRM is sent to RNC 270 prior to receiving and processing an HS-SCCH order from first target serving cell 250. In the conventional approach, UE 230 only monitors a single HC-SCCH at a given time. Moreover, the UE may perform e1d processing in a separate and distinct manner from that of RNC 270. In the example depicted in FIG. 2, UE 230 is configured to always process the latest MRM. Thus, as depicted at 214, UE 230 stops monitoring the HS-SCCH for first target serving cell 250 and begins to monitor the HS-SCCH for second target serving cell 260.

In this example, the RNC 270 is configured to always process MRM messages in sequence. Thus, as depicted at 216, RNC 270 processes the first e1d MRM, which requested a change to first target serving cell 250. RNC 270 then transmits a message to first target serving cell 250 requesting that the first target serving cell begin transmitting HS-SCCH order message to UE 230. As depicted at 220, first target serving cell 250 sends HS-SCCH order messages to UE 230. However, because UE 230 is no longer monitoring the HS-SCCH for first target serving cell 250, these messages are not received/detected. As such, UE 230 times out waiting to receive messages from second target serving cell 260. Meanwhile, RNC 270 times out waiting to receive an acknowledgement from UE 230 that the HS-SCCH order from first target cell 250 has been received. Thus, neither change request is successful, and initial serving cell 240 remains the serving cell.

This disclosure will now describe exemplary methods and apparatus for avoiding the failures depicted in FIG. 2. In accordance with the exemplary aspects described herein, the HS-SCCH for multiple channels can be monitored by a UE. As such, messages are not missed which may avoid a failed cell change process.

Figure 3:
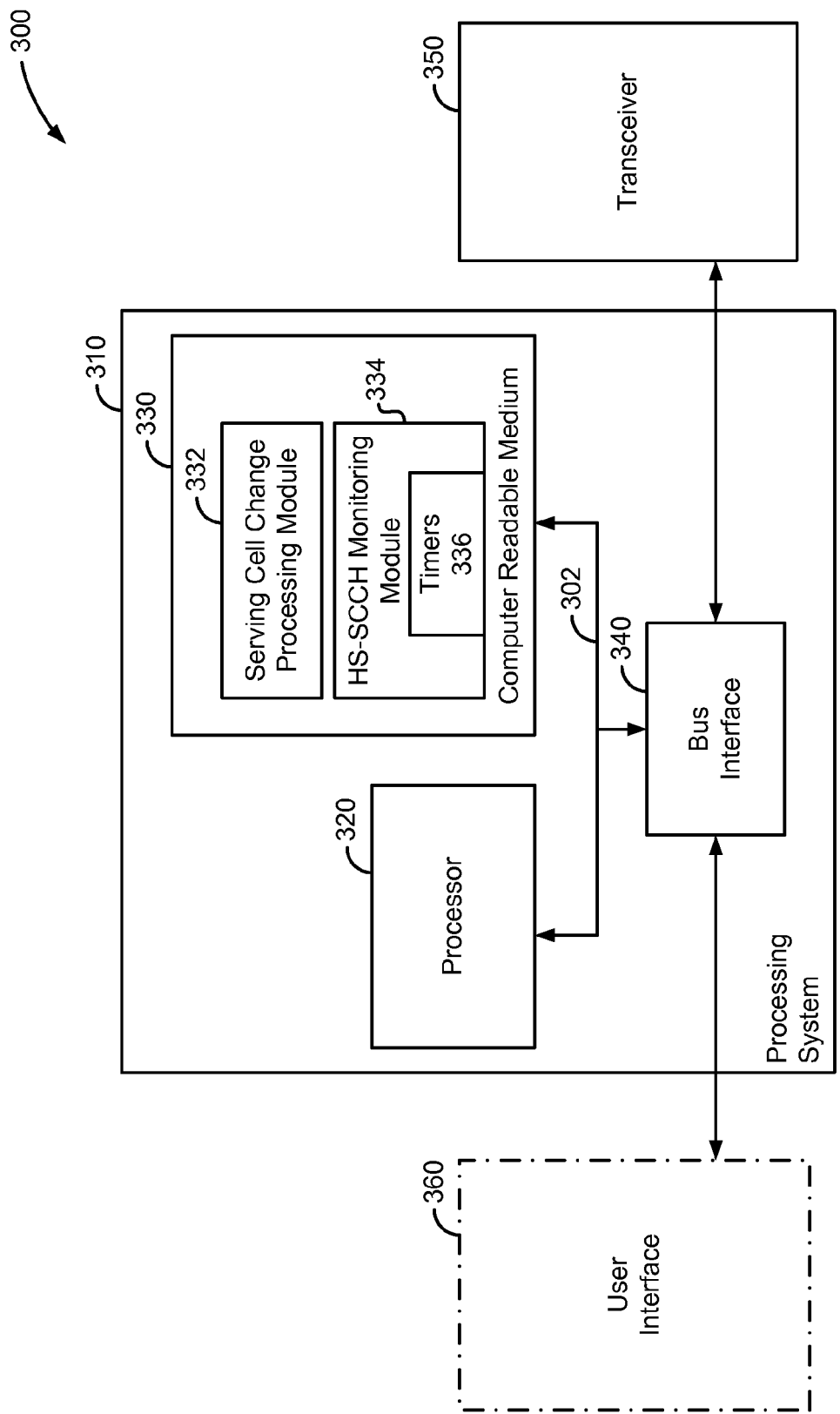
FIG. 3 is a conceptual block diagram of a hardware implementation of a user equipment, in accordance with various described aspects.

FIG. 3 is a conceptual block diagram illustrating an example of a hardware implementation for a UE 300 employing a processing system 310. In this example, processing system 310 may be implemented with a bus architecture, represented generally by bus 302. The bus 302 may include any number of interconnecting buses and bridges depending on the specific application of the processing system 310 and the overall design constraints. The bus links together various circuits including one or more processors, represented generally by processor 320, and computer-readable media, represented generally by computer-readable medium 330. The bus 302 may also link various other circuits such as timing sources, peripherals, voltage regulators, power management circuits, and the link, which are well known in the art, and therefore, will not be described any further. A bus interface 340 provides an interface between the bus 302 and transceiver 350. The transceiver 350 provides a means for communicating with various other apparatus over a transmission medium. Depending upon the nature of UE 300, a user interface 360 (e.g., keypad, display, speaker, microphone, etc.) may also be provided.

The processor 320 is responsible for managing the bus and general processing, including the execution of software stored on the computer-readable medium 330. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The functions and methods described herein may be implemented by various modules in UE 300. As used herein, the term "modules" is intended to refer to hardware, firmware, a combination of hardware and software, software, or software in execution. By way of example, a module may be a process, an object, an executable, a thread of execution, a program, an application, a routine, a subroutine, a block of code or instructions, or any other software executed by the processor 320 or by another processing device. In this example, these modules may reside in the computer readable medium 330 which represents a single storage device, multiple storage devices, or other media. The software, when executed by the processor 320, causes the processing system 310 to perform various functions described herein. The computer-readable medium 330 may also be used for storing data that is manipulated by the processor 320 when executing software.

As depicted in FIG. 3, computer readable medium 330 may store a plurality of UE processing modules, including a serving cell change processing module 332 and a HS-SCCH monitoring module 334. It is noted that while two modules are depicted, the functionality of these two modules may be performed using a single module, multiple modules, or multiple sub-modules. Serving cell change processing module 332 may be configured to maintain an active set of cells. The cells in the ASET may be candidates for becoming the serving cell if a cell becomes stronger than the current serving cell. The number of cells in the active set may be preconfigured to a maximum number of cells, depending upon the technology in use. In order to monitor additional cells, cell change processing module 332 may also maintain a monitored set for monitoring additional neighboring cells.

Cell change processing module 332 may be configured to initiate a serving cell change upon determining that criteria for a cell change have been met. Criteria may include, for example, determining that a cell other than the serving cell has become stronger, met certain quality of service requirements, etc., for a predefined time period. Serving cell change processing module 332 may be configured to generate a MRM to be transmitted to the network identifying a target cell for the serving cell change.

In accordance with exemplary aspects of the invention, HS-SCCH monitoring module 334 may be configured to maintain an HS-SCCH order monitored set that contains the set of cells for which an MRM cell change request has been generated and is still pending.

Figure 4:
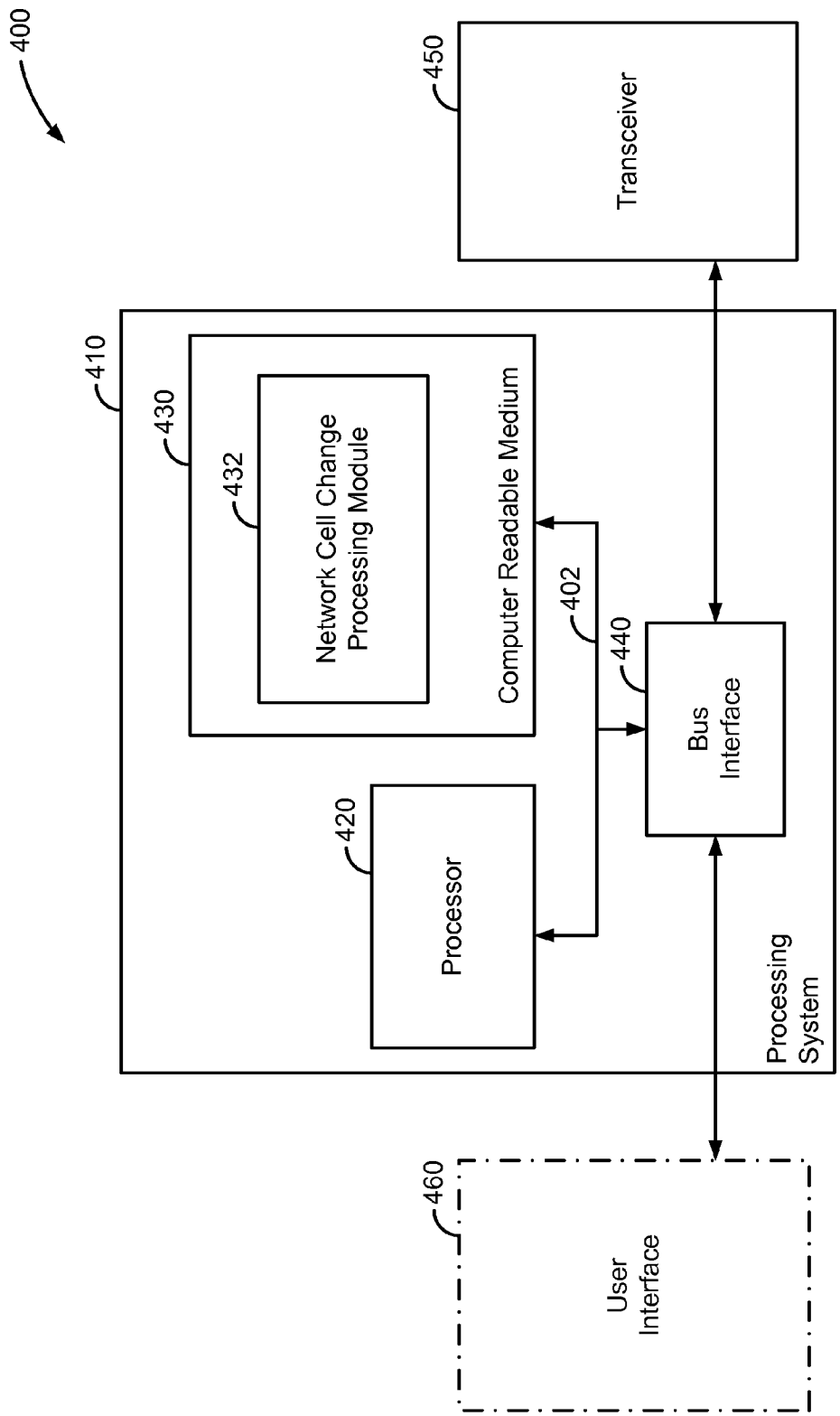
FIG. 4 is a conceptual block diagram of a hardware implementation of a radio network controller, in accordance with various disclosed aspects.

FIG. 4 depicts is a conceptual block diagram illustrating an example of a hardware implementation for an RNC 400 employing a processing system 410. In this example, processing system 410 may be implemented with a bus architecture, represented generally by bus 402. The bus 402 may include any number of interconnecting buses and bridges depending on the specific application of the processing system 410 and the overall design constraints. The bus links together various circuits including one or more processors, represented generally by processor 420, and computer-readable media, represented generally by computer-readable medium 430. The bus 402 may also link various other circuits such as timing sources, peripherals, voltage regulators, power management circuits, and the link, which are well known in the art, and therefore, will not be described any further. A bus interface 440 provides an interface between the bus 402 and transceiver 450. The transceiver 450 provides a means for communicating with various other apparatus over a transmission medium. Depending upon the nature of RNC 400, a user interface 460 (e.g., keypad, display, speaker, microphone, etc.) may also be provided.

The processor 420 is responsible for managing the bus and general processing, including the execution of software stored on the computer-readable medium 430. One or more processors in the processing system may execute software. The software may reside on a computer-readable medium. The computer-readable medium may be resident in the processing system, external to the processing system, or distributed across multiple entities including the processing system. Computer-readable medium may be embodied in a computer-program product.

As depicted in FIG. 4, computer readable medium 430 may store one or more RNC processing modules, including a network cell change processing module 432. It is noted that while only a single module is depicted, the functionality of this module may be performed using a single module, multiple modules, or multiple sub-modules. Network cell change processing module 432 may be configured to receive and process cell change request messages, such as e1d MRMs, from a UE such as UE 300 depicted in FIG. 3. Network cell change processing module 432 may be configured to implement predefined rules for processing multiple MRMs. These rules may be independent and distinct from any rules implemented by a UE in communication with RNC 400. For example, in some instances network cell change processing module 432 may be configured to process MRMs sequentially. In other implementations, module 432 may be configured to process the latest received MRM first. Network cell change processing module 432 may be further configured to issue request to target serving cells to initiate the cell change process, issue commands to update the active set by adding or dropping cells, and/or other processing.

Figure 5:
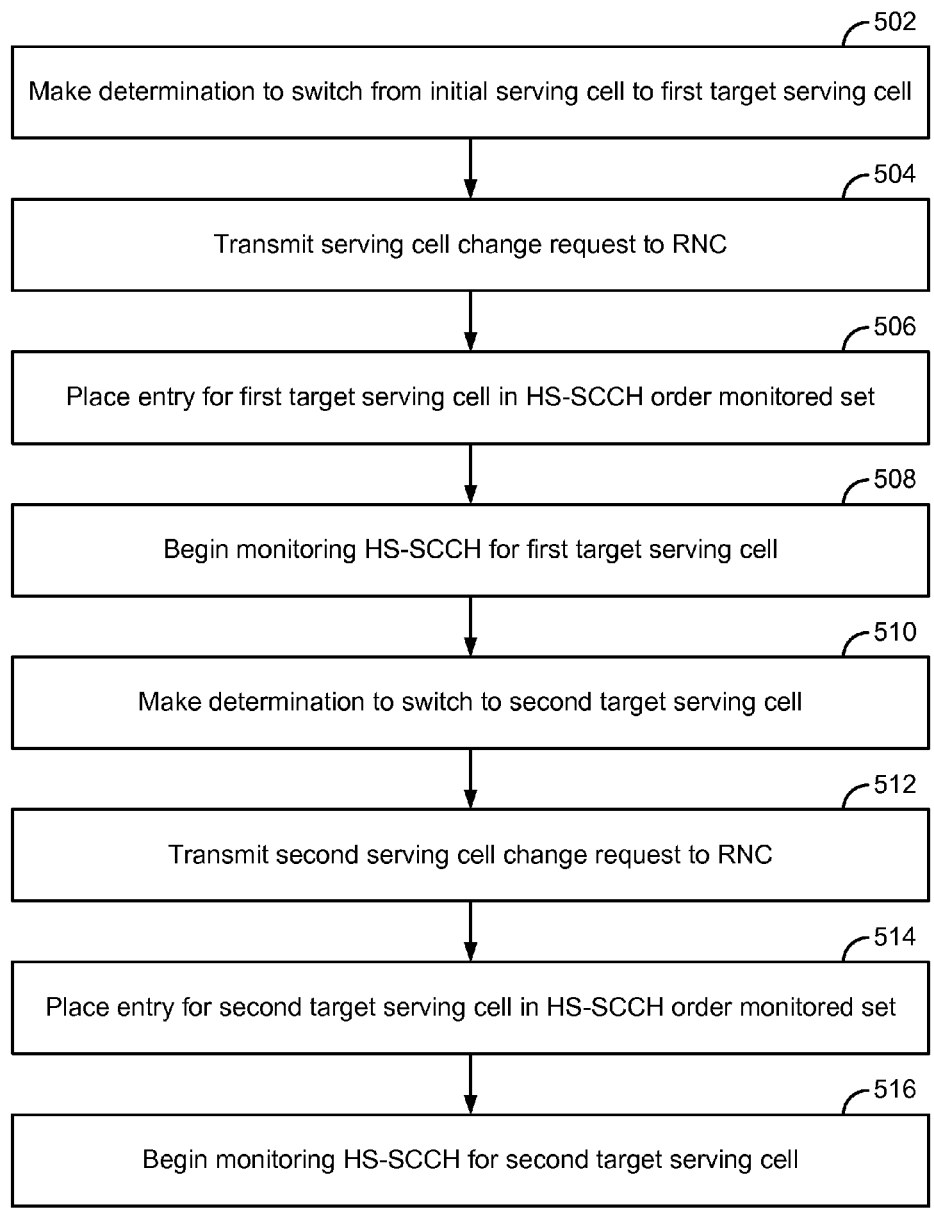
FIGS. 5-7 are flowcharts depicting various aspects of an exemplary serving cell change process, in accordance with various disclosed aspects.

FIG. 5 is a high-level flowchart illustrating a method for facilitating a serving cell change. The method depicted in FIG. 5 may be implemented, for example, by a UE. As depicted at 502, a UE may make a determination to switch from an initial serving cell to a first target serving cell. The determination to switch may be based, for example, on signal strength of the first target serving cell. As depicted at 504, the UE may transmit a serving cell change request to an RNC. The change request may be an e1d MRM. The UE may then place an entry for the first target serving cell in its HS-SCCH order monitored set, as depicted at 506. This indicates that the HS-SCCH for the first target serving cell should be monitored. As depicted at 508, the UE may begin monitoring the control channel for the first target serving cell. That is, the UE may monitor the HS-SCCH associated with the first target serving cell for HS-SCCH orders from the first target serving cell.

As depicted at 510, while monitoring the HS-SCCH for the first target serving cell, the UE may make a determination to switch to a second target serving cell. Accordingly, as depicted at 512, the UE may transmit a second cell change request (e.g., an e1d MRM) to the RNC requesting a change to the second target serving cell. An entry for the second target serving cell may then be placed in the HS-SCCH order monitored set, as depicted at 514, indicating that the second target serving cell is also to be monitored. As depicted at 516, the UE then begins monitoring the HS-SCCH channel associated with the second target serving cell.

Figure 6:
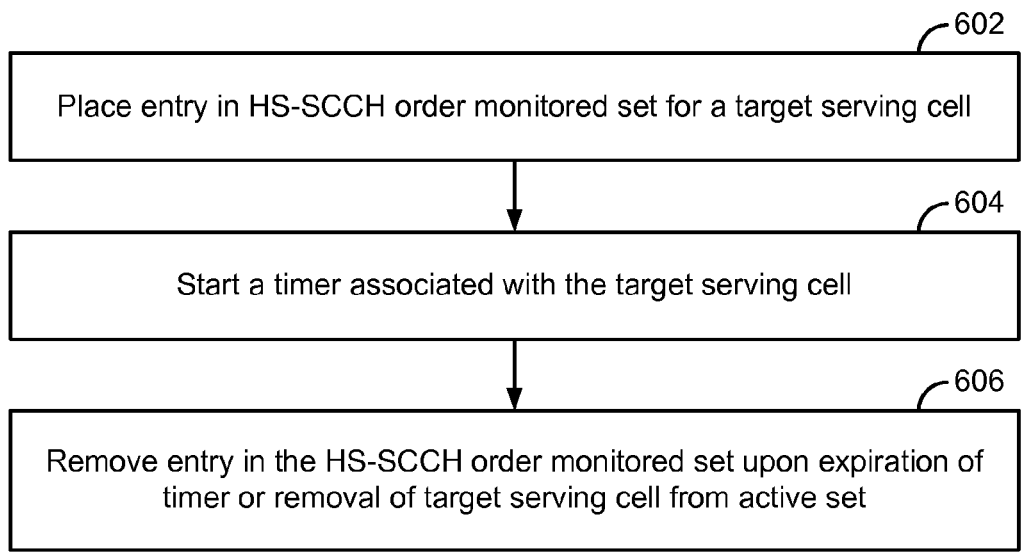

FIG. 6 is a flowchart illustrating further details of an exemplary serving cell change process. As depicted at 602, the UE may place an entry in its HS-SCCH order monitored set to monitor a target serving cell after a serving cell change request has been submitted for the target serving cell. Upon placing an entry in the HS-SCCH order monitored set, a timer associated with the target serving cell may be started, as depicted at 604. The timer may be used to provide a pre-defined monitoring period in which the UE monitors an HS-SCCH associated with the target serving cell. Thus, in the case of a rapidly changing environment wherein back-to-back e1ds have been transmitted, the UE monitors the channels for all pending requests for a pre-configured time period. As such, even if the RNC is programmed to process messages in a different order from that of the UE, the UE has time to receive all messages. As depicted at 606, an entry in the SCCH monitored set is removed upon expiration of the associated timer. This indicates that the UE no longer needs to monitor the HS-SCCH associated with the removed entry.

Figure 7:
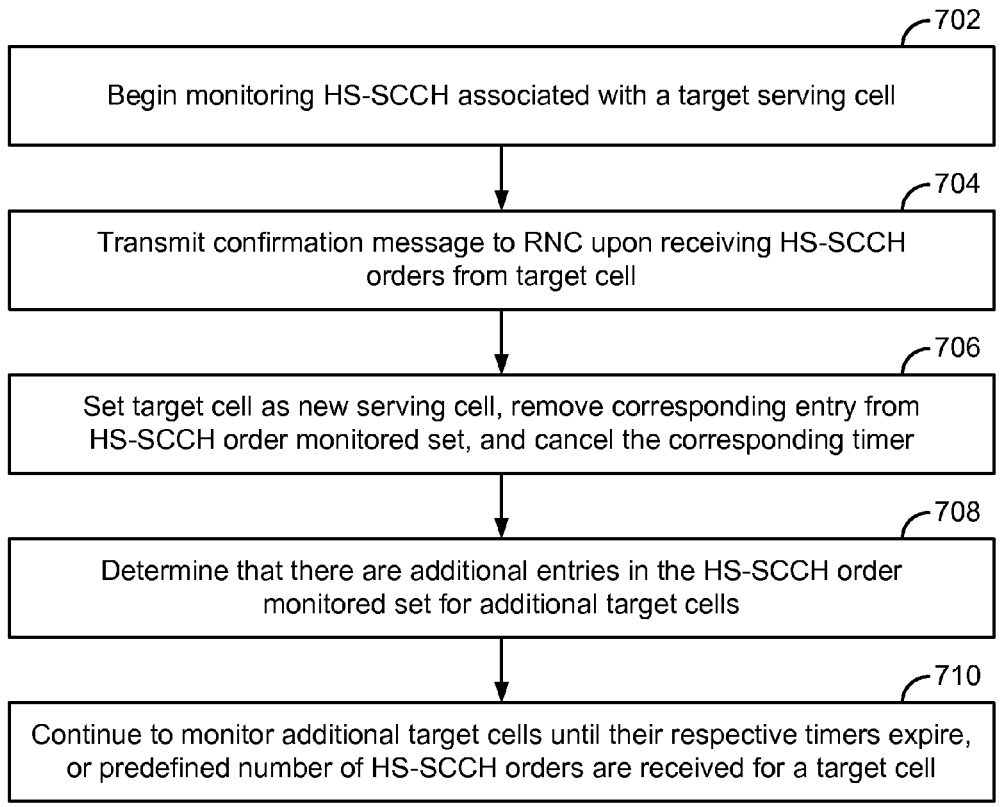

FIG. 7 is a flowchart illustrating additional details of an exemplary serving cell change process. As depicted at 702, a UE may begin monitoring the HS-SCCH associated with a target serving cell. Upon receiving the pre-defined number of HS-SCCH orders from the target serving cell, the UE may then transmit a confirmation message to the RNC to confirm the serving cell change, as depicted at 704. The UE may then set the target serving cell as its new serving cell, as depicted at 706. Upon setting the target cell as the new serving cell, the UE may also remove the corresponding entry from the HS-SCCH order monitored set, and may cancel the corresponding timer. As depicted at 708, the UE determines that there are additional entries in the HS-SCCH order monitored set for additional target serving cells. As depicted at 710, the UE continues to monitor the HS-SCCH associated with the additional serving cells until their respective timers expire, or until a predefined number of HS-SCCH orders are received for a target cell. If a predefined number of HS-SCCH orders are received for one of the additional target cells prior to expiration of its associated timer, the cell may become the new serving cell.

Figure 8:
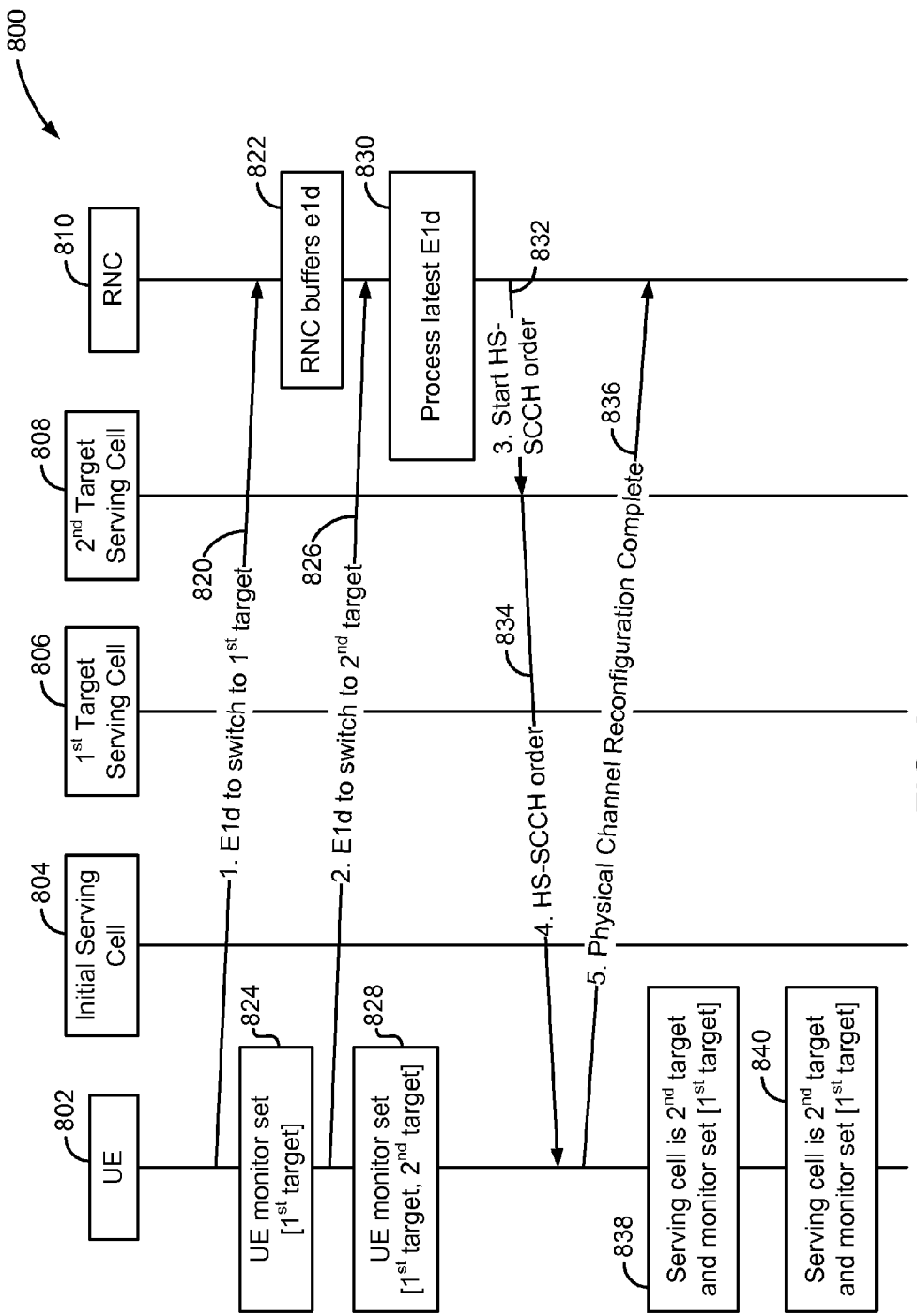
FIGS. 8-10 are message flow diagrams depicting various aspects of an exemplary cell change process, in accordance with various described aspects.

FIG. 8 is a message flow diagram 800 depicting an exemplary exchange of messages among a UE 802, an initial serving cell 804, a first target serving cell 806, a second target serving cell 808, and an RNC 810. As depicted at 820, upon determining that a serving cell switch from initial serving cell 804 to first target serving cell 806 is desired, UE 802 transmits an e1d MRM to RNC 810 requesting a switch to first target serving cell 806. The RNC 810 buffers the e1d message for processing, as depicted at 822. As depicted at 824, the initial serving cell 804 remains the serving cell, and UE 802 places an entry for first target serving cell 806 in its SCCH monitored set. At this time, the only entry in the HS-SCCH order monitored set is the entry for first target serving cell 806.

Prior to completing the serving cell change from initial serving cell 804 to first target serving cell 806, the UE 802 may determine that a switch to second target serving cell 808 is desired. Accordingly, as depicted at 826, UE 802 transmits an e1d MRM to RNC 810 requesting a serving cell change to second target serving cell 808. As depicted at 828, an entry for second target serving cell 808 is added to the SCCH monitored set. Thus, the HS-SCCH order monitored set now contains entries for first target serving cell 804 and second target serving cell 806. This means UE 802 is monitoring both HS-SCCH for both first target serving cell 804 and second target serving cell 806. While not shown in FIG. 8, UE 802 starts a timer for each of first target serving cell 804 and second target serving cell 806 upon placing an entry for each cell in the HS-SCCH order monitored set.

RNC 810 may be pre-configured with rules which indicate the order in which e1d messages are processed. In the example depicted in FIG. 8, RNC 810 has been configured to process the latest received e1d message first. Thus, as depicted at 830, RNC 810 process the e1d MRM transmitted in step 826, which requested a change to second target serving cell 806. As depicted at 832, the RNC 810 issues a command to second target serving cell 806 to start transmitting HS-SCCH orders to the UE 802. Accordingly, as depicted at 834, second target serving cell 808 transmits HS-SCCH orders to UE 802. The number of orders to be transmitted may be preconfigured by RNC 810. Once UE 802 has received the pre-defined number of HS-SCCH orders, UE 802 transmits a physical channel reconfiguration complete message to RNC 810 to confirm the serving cell change, as depicted at 836.

As depicted at 838, second target serving cell 808 becomes the new serving cell. The HS-SCCH order monitored set now contains only an entry for first target serving cell 806. Even though the serving cell change to second target serving cell is complete, UE 802 continues to monitor the HS-SCCH for first target serving cell 806 until its associated timer expires.

Figure 9:
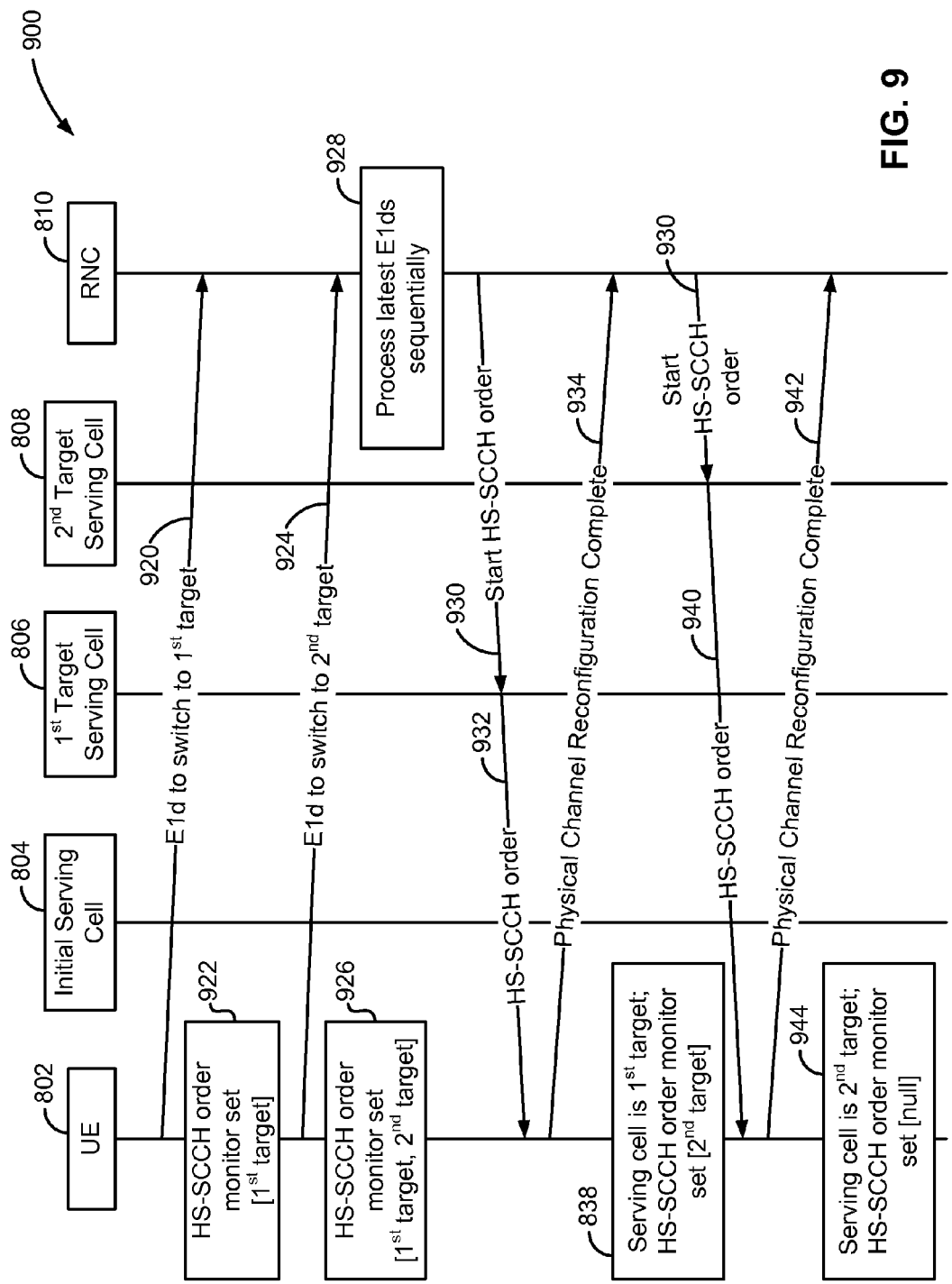

FIG. 9 is a message flow diagram 900 depicting another exemplary exchange of messages among a UE 802, an initial serving cell 804, a first target serving cell 806, a second target serving cell 808, and an RNC 810. As depicted at 920, upon determining that a serving cell switch from initial serving cell 804 to first target serving cell 806 is desired, UE 802 transmits an e1d MRM to RNC 810 requesting a switch to first target serving cell 806. As depicted at 922, the initial serving cell 804 remains the serving cell, and UE 802 places an entry for first target serving cell 806 in its SCCH monitored set. At this time, the only entry in the HS-SCCH order monitored set is the entry for first target serving cell 806.

Prior to completing the serving cell change from initial serving cell 804 to first target serving cell 806, the UE 802 may determine that a switch to second target serving cell 808 is desired. Accordingly, as depicted at 924, UE 802 transmits an e1d MRM to RNC 810 requesting a serving cell change to second target serving cell 808. As depicted at 926, an entry for second target serving cell 808 is added to the SCCH monitored set. Thus, the SCCH monitored set now contains entries for first target serving cell 804 and second target serving cell 806. This means UE 802 is monitoring both HS-SCCH for both first target serving cell 804 and second target serving cell 806. While not shown in FIG. 9, UE 802 starts a timer for each of first target serving cell 804 and second target serving cell 806 upon placing an entry for each cell in the SCCH monitored set.

RNC 810 may be pre-configured with rules which indicate the order in which e1d messages are processed. In the example depicted in FIG. 9, RNC 810 has been configured to process e1d message sequentially, as depicted at 928. Thus, as depicted at 930, the RNC 810 issues a command to first target serving cell 806 to start transmitting HS-SCCH orders to the UE 802. Accordingly, as depicted at 932, first target serving cell 806 transmits HS-SCCH orders to UE 802. The number of orders to be transmitted may be preconfigured by RNC 810. Once UE 802 has received the pre-defined number of HS-SCCH orders, UE 802 transmits a physical channel reconfiguration complete message to RNC 810 to confirm the serving cell change, as depicted at 934.

As depicted at 936, first target serving cell 806 becomes the new serving cell. The SCCH monitored set now contains only an entry for second target serving cell 808. Even though the serving cell change to first target serving cell is complete, UE 802 continues to monitor the HS-SCCH for second target serving cell 808 until its associated timer expires. As depicted at 938, RNC 810 issues a command to second target serving cell 808 to begin transmitting HS-SCCH orders to UE 802. Accordingly, as depicted at 940, second target serving cell 808 transmits HS-SCCH orders to UE 802. The HS-SCCH orders from second target serving cell 808 are received prior to expiration of the associated timer. Accordingly, as depicted at 942, UE 802 transmits a physical channel reconfiguration complete message to RNC 810 to confirm the serving cell change to second target serving cell 808. Thus, as depicted at 944, the UE 802 sets the second target serving cell 808 as the new serving cell.

In the examples depicted in FIGS. 8 and 9, back-to-back e1d MRMs are transmitted. The transmission of back-to-back e1d MRMs is likely to occur in fast-changing radio environments. For example, when a UE is moving through an urban canyon, or among hills and valleys, it is likely that the signal strengths associated with candidate cells will change often. Moreover, the process of reconfiguring a packet data protocol (PDP) context may take up to a few seconds. During this time, in a fast changing radio environment, it is very likely that back to back MRM events are triggered.

Figure 10:
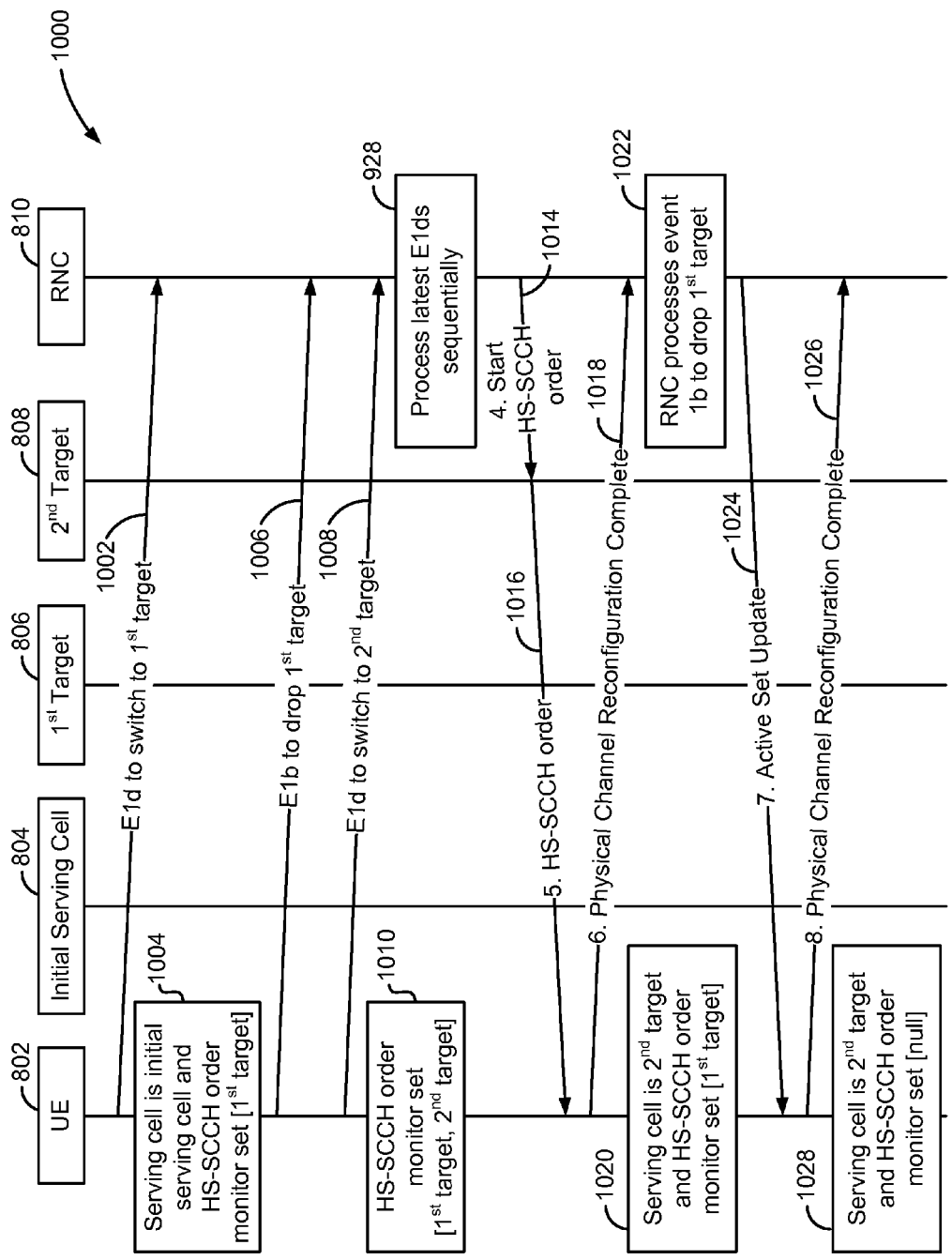

In addition to e1d MRMs, which are used to request a cell change switch, a UE may also transmit event 1b ("e1b") messages to drop a cell. FIG. 10 is a message flow diagram 1000 depicting another exemplary exchange of messages among a UE 802, an initial serving cell 804, a first target serving cell 806, a second target serving cell 808, and an RNC 810m wherein e1d and e1b messages are processed. As depicted at 1002, UE 802 transmits an e1d MRM to RNC 810 requesting to switch from initial serving cell 804 to first target serving cell 806. As depicted at 1004, while the initial serving cell 804 remains the serving cell, UE 802 adds an entry to its SCCH monitored set for first target serving cell 806. The UE may also activate a timer associated with first target serving cell 806.

After transmitting the e1d MRM to switch to first target serving cell 806, the UE 802 may determine that the first target serving cell 806 should be dropped from its active set. For example, the signal from first target serving cell 806 may be lost, may drop below a pre-defined threshold, or otherwise fail to meet the requirements for being included in the ASET. Thus, as depicted at 1006, UE 802 may transmit an e1b message to RNC 810 requesting that first target serving cell 806 be dropped from its active set. UE 802 may then transmit an e1d MRM to RNC 810 requesting a serving cell change to second target serving cell 808, as depicted at 1008. Thus, as depicted at 1010, an entry for second target serving cell 808 is added to the SCCH monitored set, and an associated timer is started.

In the example depicted in FIG. 10, RNC 810 may be configured to process e1d message sequentially. Thus, the MRM to switch to first target serving cell 806 would be processed first. However, the RNC 810 may further be configured to drop the e1d request to switch to the first target cell since it has also received an e1b message to drop the first target serving cell from the ASET. Accordingly, as depicted at 1010, RNC 810 processes the e1d MRM to switch to second target serving cell 808 first. RNC 810 orders second target serving cell 808 to begin transmitting HS-SCCH orders, as depicted at 1014, and the second target serving cell 808 complies, as depicted at 1016.

Upon receipt of the pre-defined number of HS-SCCH orders from second target serving cell 808, UE 802 transmits a physical channel reconfiguration complete message to RNC 810, as depicted at 1018. Accordingly, as depicted at 1020, second target serving cell 808 becomes the new serving cell, and the SCCH monitored set retains its entry for first target serving cell 806. As depicted at 1022, the RNC 810 may then begin to process the e1b MRM transmitted by UE 802 in step 1006. The RNC 810 issues an active set update message to UE 802 instructing the UE to remove the first target serving cell 806 from its ASET, as depicted at 1024. The UE 802 responds with a physical channel reconfiguration complete message, as depicted at 1026, and UE 802 removes the entry for the first target serving cell 806 from its HS-SCCH order monitored set, as depicted at 1028.

Figure 11:
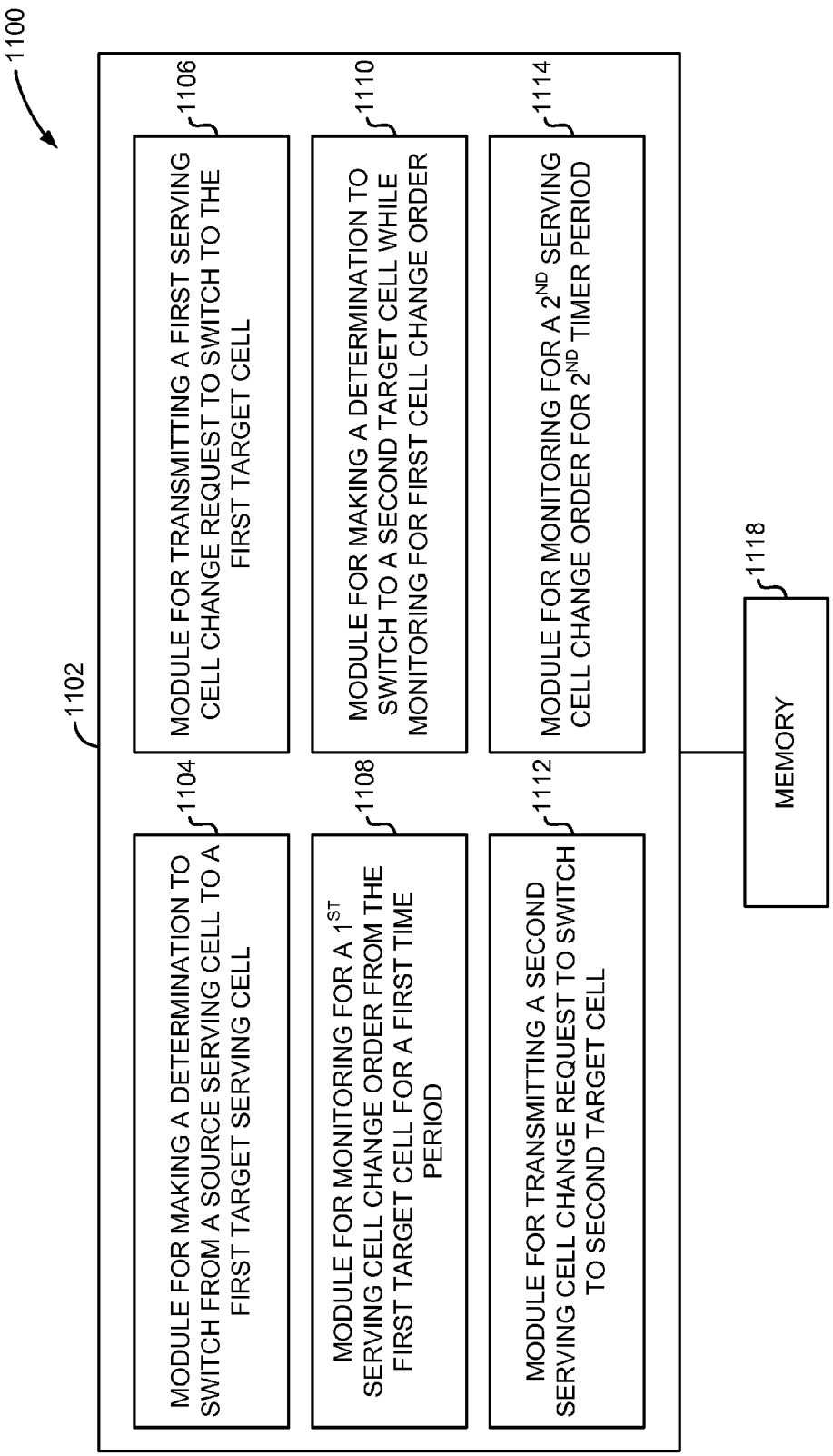
FIG. 11 is a system 1100 for managing serving cell changes.

Turning to FIG. 11, illustrated is a system 1100 for managing serving cell changes. As depicted, system 1100 includes functional blocks that can represent functions implemented by a processor, software, or combination thereof (e.g., firmware). System 1100 includes a logical grouping 1102 of electrical components that act in conjunction. System 1100 may be implemented, for example, by a UE.

Logical grouping 1102 can include a module for making a first determination to switch to a high speed data link from a source serving cell to a first target serving cell 1104. Moreover, logical grouping 1102 can include a module transmitting a first serving cell change request message indicating the first determination to switch to the first target serving cell 1106. Logical group 1102 may further include a module for monitoring for a first serving cell change order from the first target serving cell for a time period associated with a first timer 1108; a module for making a second determination, while monitoring for the first serving cell change order from the first target cell, to switch the high speed data link to a second target serving cell 1110; a module for transmitting a second serving cell change request message indicating the second determination to switch to the second target serving cell 1112; and a module for monitoring for a second serving cell change order from the second target serving cell for a second timer period associated with a second timer, the second time period occurring during at least a portion of the first timer period 1114. Additionally, system 1100 can include a memory 1118 that retains instructions for executing functions associated with electrical components 1104-1114. While shown as being external to memory 1118, it is to be understood that electrical components 1104-1114 can exist within memory 1118.

As used in this application, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of changing a high speed data serving cell, comprising:
   making a first determination, at a mobile user equipment, to switch a high speed data link from a source serving cell to a first target serving cell;
   transmitting a first serving cell change request message indicating the first determination to switch to the first target serving cell;
   monitoring for a first serving cell change order from the first target serving cell for at least part of a first time period associated with a first timer;
   making a second determination, while monitoring for the first serving cell change order from the first target cell, to switch the high speed data link to a second target serving cell;
   transmitting a second serving cell change request message indicating the second determination to switch to the second target serving cell; and
   monitoring for a second serving cell change order from the second target serving cell for at least part of a second time period associated with a second timer, the second time period occurring during at least a portion of the first time period;
   storing data related to the first target serving cell and the second target serving cell in an HS-SCCH order monitored set;
   starting the first timer upon storing data related to the first target serving cell in the HS-SCCH order monitored set;
   starting the second timer upon storing data related to the second target serving cell in the HS-SCCH order monitored set; and
   removing data related to the first target serving cell or data related to the second target serving cell from the HS- SCCH order monitored set at least upon expiration of the first timer or the second timer, respectively.

2. The method of claim 1, wherein transmitting the first serving cell change request message is performed upon determining that the first target serving cell has become stronger than the source serving cell.

3. The method of claim 1, wherein transmitting the second serving cell change request message is performed upon determining that the second target serving cell has become stronger than at least one of the source serving cell and the first target serving cell.

4. The method of claim 1, wherein at least one of the first serving cell change request message and the second serving cell change request message comprises an event 1d measurement report message.

5. The method of claim 1, further comprising:
transmitting a physical channel reconfiguration acknowledgement message to a radio network controller upon receipt of a pre-designated number of serving cell change orders from the first target serving cell; and
setting the first target serving cell as the new serving cell; and
continuing to monitor the second target serving cell until the second timer expires.

6. The method of claim 5, further comprising:
receiving a pre-designated number of serving cell change orders from the second target serving cell after setting the first target serving cell as the new serving cell and before expiration of the second timer; and
setting the second target serving cell as the new serving cell.

7. The method of claim 1, further comprising:
receiving a pre-designated number of serving cell change orders from the second target serving cell prior to receiving a pre-designated number of serving cell change orders from the first target serving cell;
setting the second target serving cell as the new serving cell; and
continuing to monitor the first target serving cell until the first timer expires.

8. The method of claim 1, further comprising:
making a third determination, at the mobile user equipment, to drop the first target serving cell after transmitting the first serving cell change message; and
continuing to monitor the first target serving cell until the first timer expires or until receipt of an active set update message.

9. The method of claim 1, further comprising:
wherein the monitoring for the first serving cell change order for at least part of the first time period further comprises monitoring until an earlier one of an expiration of the first time period and a receipt of a pre-designated number of serving cell change orders from the first target serving cell;
wherein the monitoring for the second serving cell change order for at least part of the second time period further comprises monitoring until an earlier one of an expiration of the second time period and a receipt of a pre-designated number of serving cell change orders from the second target serving cell;
wherein the removing of the data related to the first target serving cell or the data related to the second target serving cell further comprises removing at least upon the receipt of the pre-designated number of serving cell change orders from the first target serving cell, or upon the receipt of the pre-designated number of serving cell change orders from the second target serving cell.

10. An apparatus, comprising:
means for making a first determination to switch a high speed data link from a source serving cell to a first target serving cell;
means for transmitting a first serving cell change request message indicating the first determination to switch to the first target serving cell;
means for monitoring for a first serving cell change order from the first target serving cell for at least a part of a first time period associated with a first timer;
means for making a second determination, while monitoring for the first serving cell change order from the first target cell, to switch the high speed data link to a second target serving cell;
means for transmitting a second serving cell change request message indicating the second determination to switch to the second target serving cell; and
means for monitoring for a second serving cell change order from the second target serving cell for at least a part of a second time period associated with a second timer, the second time period occurring during at least a portion of the first time period;
means for storing data related to the first target serving cell and the second target serving cell in an HS-SCCH order monitored set;
means for starting the first timer upon storing data related to the first target serving cell in the HS-SCCH order monitored set;
means for starting the second timer upon storing data related to the second target serving cell in the HS-SCCH order monitored set; and
means for removing data related to the first target serving cell or data related to the second target serving cell from the HS-SCCH order monitored set at least upon expiration of the first timer or the second timer, respectively.

11. An apparatus, comprising:
a serving cell processing module configured to:
make a first determination to switch a high speed data link from a source serving cell to a first target serving cell; and
transmit a first serving cell change request message indicating the first determination to switch to the first target serving cell; and
a HS-SCCH monitoring module configured to:
monitor for a first serving cell change order from the first target serving cell for at least a part of a first time period associated with a first timer,
wherein the serving cell processing module is further configured to make a second determination, while monitoring for the first time period, to switch the high speed data link to a second target serving cell, and to transmit a second serving cell change request message indicating the second determination to switch to the second target serving cell, and
wherein the HS-SCCH monitoring module is further configured to:
monitor for a second serving cell change order from the second target serving cell for at least a part of a second time period associated with a second timer, the second time period occurring during at least a portion of the first time period;
start the first timer upon storing data related to the first target serving cell in an HS-SCCH order monitored set;
start the second timer upon storing data related to the second target serving cell in the HS-SCCH order monitored set; and remove data related to the first target serving cell or data related to the second target serving cell from the HS-SCCH order monitored set at least upon expiration of the first or the second timer, respectively.

12. The apparatus of claim 11, wherein serving cell processing module is further configured to:
transmit the first serving cell change order upon determining that the first target serving cell has become stronger than the source serving cell.

13. The apparatus of claim 11, wherein the serving cell processing module is further configured to:
transmit the second serving cell change order upon determining that the second target serving cell has become stronger than at least one of the source serving cell and the first target serving cell.

14. The apparatus of claim 11, wherein at least one of the first serving cell change order and the second cell change order comprises an event 1d measurement report message.

15. The apparatus of claim 11, wherein the serving cell processing module is further configured to:
transmit a physical channel reconfiguration acknowledgement message to a radio network controller upon receipt of a pre-designed number of serving cell change orders from the first target serving cell; and
set the first target serving cell as the new serving cell, and wherein the HS-SCCH monitoring module is further configured to monitor the second target serving cell until the second timer expires.

16. The apparatus of claim 15, wherein the HS-SCCH monitoring module is further configured to receive a pre-designated number of serving cell change orders from the second target serving cell after setting the first target serving cell as the new serving cell and before expiration of the second timer, and wherein the serving cell processing module is further configured to set the second target serving cell as the new serving cell.

17. The apparatus of claim 11, wherein the HS-SCCH monitoring module is further configured to receive a pre-designated number of serving cell change orders from the second target serving cell prior to receiving a pre-designated number of serving cell change orders from the first target serving cell, and the serving cell processing module is further configured to set the second target cell as the new serving cell,
wherein the HS-SCCH module is further configured to continue to monitor the first target serving cell until the first timer expires.

18. The apparatus of claim 11, wherein the serving cell processing module is further configured to make a third determination to drop the first target serving cell after transmitting the first serving change request message, and
wherein the HS-SCCH monitoring is further configured to continue to monitor the first target serving cell until the first time expires or until receipt of an active set update message.

19. The apparatus of claim 11, wherein the HS-SCCH monitoring module is further configured to:
monitor for the first serving cell change order for at least part of the first time period until an earlier one of an expiration of the first time period and a receipt of a pre-designated number of serving cell change orders from the first target serving cell;
monitor for the first serving cell change order for at least part of the second time period until an earlier one of an expiration of the second time period and a receipt of a pre-designated number of serving cell change orders from the second target serving cell;
remove the data related to the first target serving cell or the data related to the second target serving cell at least upon the receipt of the pre-designated number of serving cell change orders from the first target serving cell, or upon the receipt of the pre-designated number of serving cell change orders from the second target serving cell.

20. A non-transitory computer-readable medium comprising a computer program product wherein the computer program product executable by a computer to:
make a first determination to switch a high speed data link from a source serving cell to a first target serving cell;
transmit a first serving cell change request message indicating the first determination to switch to the first target serving cell;
monitor for a first serving cell change order from the first target serving cell for at least a part of a first time period associated with a first timer;
make a second determination, while monitoring for the first serving cell change order from the first target cell, to switch the high speed data link to a second target serving cell;
transmit a second serving cell change request message indicating the second determination to switch to the second target serving cell; and
monitor for a second serving cell change order from the second target serving cell for at least a part of a second time period associated with a second timer, the second time period occurring during at least a portion of the first time period;
store data related to the first target serving cell and the second target serving cell in an HS-SCCH order monitored set;
start the first timer upon storing data related to the first target serving cell in the HS-SCCH order monitored set;
start the second timer upon storing data related to the second target serving cell in the HS-SCCH order monitored set; and
remove data related to the first target serving cell or data related to the second target serving cell from the HS-SCCH order monitored set at least upon expiration of the first timer or the second timer, respectively.

* * * * *